United States Patent [19]
Yuuki

[11] Patent Number: 6,094,517
[45] Date of Patent: Jul. 25, 2000

[54] OPTICAL TRANSMISSION DEVICE

[75] Inventor: Hayato Yuuki, Yokkaichi, Japan

[73] Assignee: Sumitomo Wiring Systems, Ltd., Yokkaichi, Japan

[21] Appl. No.: 09/030,446

[22] Filed: Feb. 25, 1998

[30] Foreign Application Priority Data

Feb. 26, 1997 [JP] Japan .................................. 9-042423

[51] Int. Cl.[7] ........................................................ G02B 6/36
[52] U.S. Cl. .................................. 385/43; 385/88; 385/89
[58] Field of Search .................................. 385/43, 99, 78, 385/89, 60, 66, 84, 88

[56] References Cited

U.S. PATENT DOCUMENTS

| | | | |
|---|---|---|---|
| 3,832,028 | 8/1974 | Kapron | 385/43 |
| 4,500,164 | 2/1985 | Kiyohara | 350/96.1 |
| 4,521,070 | 6/1985 | Sottini et al. | 385/43 |
| 5,278,929 | 1/1994 | Tanisawa et al. | 385/93 |
| 5,373,571 | 12/1994 | Reid et al. | 385/31 |
| 5,852,692 | 12/1998 | Nightingale et al. | 385/43 |

*Primary Examiner*—Hung N. Ngo
*Attorney, Agent, or Firm*—Greenblum & Bernstein, P.L.C.

[57] ABSTRACT

A fiber optic cable has a light-exiting face. A cable-adapter is affixed to the light-exiting face. The cable-adapter has a cylindrical outer surface, a diameter of which is gradually tapered down. Light leaving the face of the cable is moved towards an optical receptor and gradually converged, by virtue of the tapered cylindrical surface, of the cable-adapter and emitted. In this manner, an optical loss is minimized. To prevent a leak through the tapered surface, the tapered surface is coated with a low refractive index film. Further, a ferrule is used to position the cable-adapter relative to the fiber optic cable. By virtue of this configuration, an optical leakage can be minimized when the light is received by an optical receptor having a small surface chip.

22 Claims, 6 Drawing Sheets

Prior Art

OPTICAL TRANSMISSION DEVICE

BACKGROUND OF THE INVENTION

1. Field of the Invention

The present invention relates to a light communication system. In particular, the present invention is directed to a device that enables a transmission between an optical fiber and a light receptor, and, specifically, an optical transmission device that is used to transmit a signal between an optical fiber and a light receptor.

2. Description of Background Information

Generally, two main types of optical fiber cables are employed; glass optical fibers and plastic optical fibers.

Glass optical fibers have a higher transparency, as compared to plastic optical fibers. When the precision of the light transmission is to be improved, the diameter of the core part of the optical fiber is designed to be as small as possible. As a result, the ability of the glass optical fiber to carry a single mode signal is enhanced.

On the other hand, plastic optical fibers offer a better resistance to bending and countermeasures to an optical interference or attenuation in the fiber can be envisaged. The diameter of a plastic optical fiber is usually greater than the diameter of a glass optical fiber. Due to the larger diameter, plastic optical fibers tend to suffer from a certain level of mode dispersion, thereby causing light transmission loss and wave deformation. Nonetheless, due to the relatively large diameter of the optical fiber, high precision alignment of one optical fiber to another optical fiber (or an optical fiber to an element, such as, for example, a receptor) is not required. Plastic optical fibers are therefore easily optically aligned, are less costly than glass optical fibers, and thus, are used in optical communications devices. Because of its large diameter, a known plastic fiber can receive a certain number of optical signals emitted by a light emitting diode (LED) into this optical fiber. These optical signals may then exit and be received by a large chip-size photodiode (PD), which transforms the optical signals into electrical signals.

In recent optical fiber-communications, research has taken place into high speed optical communications having a speed of, for example, several hundreds of Mbps (megabits per second) to an order of several Gbps (gigabits per second). A surface of a receptor-side photodiode, to be irradiated by a light to generate excited electrons, has a limited chip size. The electrons move to a position located at a chip terminal, where wires are bonded. The greater the chip surface of the photodiode, the longer it takes for the electrons to move from one point to another point (e.g., electron movement time increases). Therefore, the chip surface of the photodiode should be designed to be as small as possible.

However, in the case of a photodiode having a small surface chip, the known plastic optical fibers have been designed to have a large opening diameter, as mentioned above. As a result, as shown in FIG. 1 of the drawings, only part of the signal coming out of light-exit end face A2 of the fiber optic (optical fiber) A1 is received by the photodiode A3. Thus, the optical loss is increased between the light-exit end face A2 and the photodiode A3.

When the plastic optical fiber has, for example, an end external diameter of 750 $\mu$m, a uniform light can be emitted therefrom and received by a photodiode having a light-reception diameter face of 250 $\mu$m. If calculated on the basis of the surface ratio, only 11% of the original light volume is received. This means that, when transformed into decibel milliwatt (dBm) ratings, the light volume is decreased by 9.54 dBm.

Thus, a large open diameter plastic fiber A1, though easily handled, is poorly adapted to a photodiode $A_3$ having a small chip surface designed for receiving a high speed signal, as a large loss occurs due to the bonding of a large diameter optical fiber to a small diameter photodiode.

Accordingly, a purpose of the present invention is to provide an optical-transmission device which, when used with an optical receptor having a small surface chip, reduces the optical loss due to bonding.

SUMMARY OF THE INVENTION

In order to solve the above-mentioned problem, there is provided an optical-transmission device having an optical axis, comprising:

a fiber optic cable (optical fiber cable) having a light-exit face of a predetermined diameter;

cable-adapting means (cable-adapter) for connecting the fiber optic cable to a light-receiving element. The cable-adapting means (cable-adapter) comprises a frusto-conical shape having a tapered cylindrical surface with a large face and a small end face. The large face has a diameter substantially equal to that of the light-exit face of the fiber optic cable, the diameter gradually decreasing (tapering) as it goes away from the light-exit face along an optical axis; and a ferrule that covers at least the light-exit face of the fiber optic cable and the large face of the cable-adapting means.

Accordingly, light entering one end portion of the fiber optic cable is led through the fiber optic cable by reflecting on the tapered surface of the fiber optic cable. Therefore, when a small surface chip is used as an outside optical element, both units are bonded, such that the light is efficiently guided therebetween. The optical loss is thus greatly reduced. Further, the fiber optic cable and the cable-adapting means are properly positioned and fixed in the ferrule. These units can be positioned without using another element. The number of pieces used to couple the fiber optic cable to the photo receptor is thus reduced.

The ferrule may comprise an inside surface corresponding to a tapered cylindrical surface of the cable-adapting means, thereby securely holding the cable-adapting means. Therefore, the cable-adapting means can be positioned more securely and easily in the ferrule.

Moreover, the cable-adapting means may comprise an optical fiber (fiber optic) material having a same level of numerical aperture as that of the fiber optic cable. The numerical aperture of the fiber optic cable can therefore be matched with the numerical aperture of the cable-adapting means. Thus, light leaving the fiber optic cable can be efficiently led through the cable-adapting means.

Advantageously, the fiber optic cable and the cable-adapting means, respectively, comprise a core portion having a same level of refractive index to the other. The fiber optic cable is bonded to the cable-adapting means through a transparent binding material having a same level of refractive index as that of the core portion. A Fresnel reflection is thus efficiently suppressed at the bonding interface, and the optical transmission of the cable is improved.

According to another advantage of the present invention, the fiber optic cable and the cable-adapting means may be integrally formed. As a result, Fresnel reflection is prevented and an optical transmission is improved.

Advantageously, the cable-adapting means comprise a clad portion having a same level of refractive index to that of the core portion.

The clad portion may be covered with a coating having a refractive index that is lower than that of the clad portion. By virtue of this structure, light led to the tapered surface of the cable-adapting means and going therethrough for leaking is reflected back towards the interior of the cable-adapting means by the coating. As a result, an optical loss in the cable-adapting means is greatly reduced.

According to another advantage of the present invention, the fiber optic cable may comprise a plastic optical-fibercable. The optical-fibercable may comprise, for example, a step-index type optical-fiber cable, or a graded-index type optical-fiber cable.

According to an object of the present invention, an optical-transmission device having an optical axis is disclosed, comprising:

a fiber optic cable having a light-exit face with a predetermined diameter;

a cable-adapter that connects the fiber optic cable to a light-receiving element, the cable-adapter having a frusto-conical shape with a tapered cylindrical surface with a large face and a small end face, the large face having a diameter substantially equal to the predetermined diameter of the light-exit face of the fiber optic cable, the tapered cylindrical surface gradually decreasing as one moves from the large face towards the small end face along the optical axis; and a ferrule that covers at least the light-exit face of the fiber optic cable and the large face of the cable-adapter.

According to an advantage of the instant invention, the ferrule has an inside surface corresponding to the tapered cylindrical surface of the cable-adapter, to thereby securely hold the cable-adapter.

According to a feature of the present invention, the cable-adapter comprises an optical fiber material having a same level of numerical aperture as that of the fiber optic cable.

According to another feature of the instant invention, the fiber optic cable and the cable-adapter respectively comprise a core portion having a same level of refractive index as the other, and are bonded to each other via a transparent binding material having a same level of refractive index as that of the core portion.

A feature of the instant invention is that the fiber optic cable and the cable-adapter are integrally formed. Additionally, the fiber optic cable may be a plastic fiber optic cable, comprising either a step-index type fiber optic cable, or a graded-index type fiber optic cable.

According to another advantage of the instant invention, the cable-adapter comprise a core portion and a clad portion. The clad portion has a same level of refractive index as that of the core portion. In addition, the clad portion may be covered with a coating having a refractive index lower than that of the clad portion.

According to another object of the present invention, an optical-transmission device having an optical axis is disclosed, comprising:

a fiber optic cable having a light-exit face with a predetermined diameter;

cable-adapting means for adapting the fiber optic cable to a light-receiving element, the cable-adapting means having a certain shape with a tapered cylindrical surface and a large face and a small end face, the large face having a diameter substantially equal to the predetermined diameter of the light-exit face of the fiber optic cable, the tapered cylindrical surface gradually decreasing as one moves from the large face towards the small end face along the optical axis; and a ferrule that covers at least the light-exit face of the fiber optic cable and the large face of the cable-adapting means.

The present disclosure relates to subject matter contained in Japanese Patent Application No. HEI 9-042423, filed on Feb. 26, 1997, which is expressly incorporated herein by reference in its entirety.

BRIEF DESCRIPTION OF THE DRAWINGS

The foregoing and other objects, features and advantages of the invention will be apparent from the following more particular description of preferred embodiments of the invention, as illustrated in the accompanying drawings in which reference characters refer to the same parts throughout the different views. The drawings are not necessarily to scale, emphasis instead being placed upon illustrating principles of the invention in a clear manner, in which.

DETAILED DESCRIPTION OF THE PREFERRED EMBODIMENTS

Figure 2:
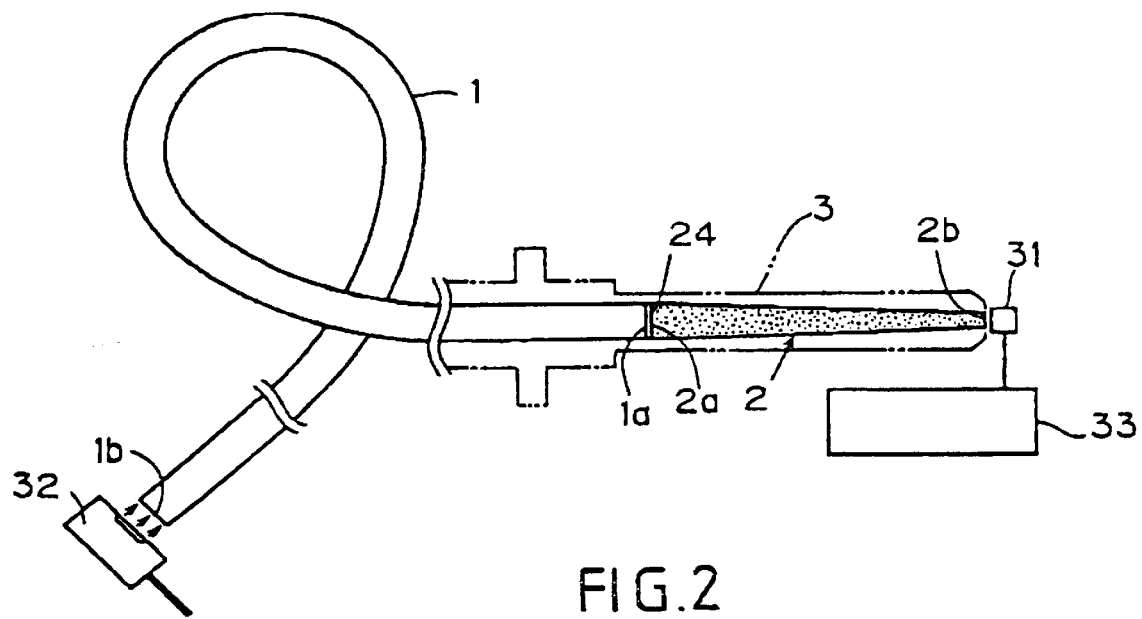
FIG. 2 illustrates a schematic structure of an optical-transmission device according to a first embodiment of the present invention.

FIG. 2 illustrates an optical-transmission device according to a first embodiment of the present invention. As shown in FIG. 2, cable-adapting device (cable adapter) 2 has a substantially frusto-conical shape. The cable adapter 2 is bound to a light-exit end-face 1*a* of a plastic optical cable 1, such that a light signal inputted to the fiber optic cable at a light-receiving face 1*b* (by, for example, a light emitting diode (LED)), exits via a light-exit end-face 1*a*, and is injected onto a large face 2*a* of the cable adapter 2. The light signal then exits via a small face 2*b* of the cable adapter 2 to impinge upon a photodiode 31. In the disclosed embodiment, the cable-adapter 2 is housed into a ferrule 3.

Figure 1:
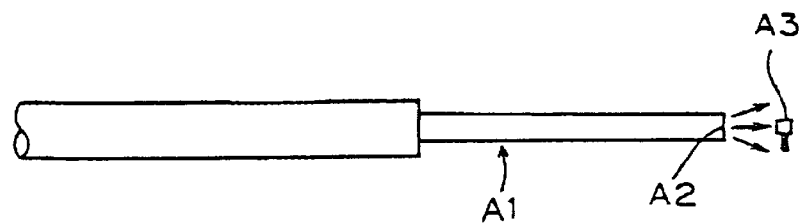
FIG. 1 illustrates a functioning of a prior art optical-transmission device.
Figure 3:
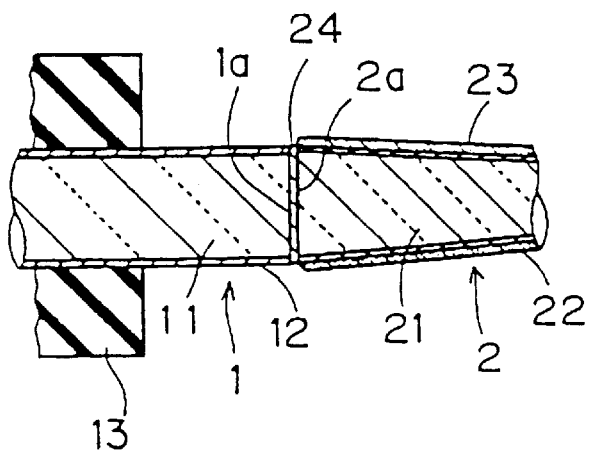
FIG. 3 illustrates a cross-sectional view of a bonding portion between a fiber optical cable (optical-fiber cable) and a cable-adapting device of the optical-transmission device, according to the first embodiment.

Fiber optic cable 1 typically has a relatively small difference of refractive index between its core portion and its clad portion. The fiber optic cable 1 illustrated in FIG. 1 has a low level of numerical aperture (NA), and belongs to a step-index type fiber. As shown in FIG. 3, the fiber optic cable 1 has a core portion 11 that is made of a plastic material having a refractive index of approximately 1.495, such as, for example, PMMA (polymethylmethacrylate) or other similar material. The optical-fiber cable 1 further includes a clad portion 12 that coats (covers) core portion 11. The clad portion 12 is made of a material, such as, for example, a fluorocarbon polymer having a refractive index of approximately 1.493, such as, for example, PTFE (polytetrafluoroethylene) or other similar material. The external cylindrical surface of the clad portion 12 is also covered with a coating 13 made of, for example, a plastic material, such as, for example, polyethylene or other plastic. The optical fiber cable 1 is stripped of the coating 13 from its end portion along a predetermined length, thereby exposing the light-exit end-face 1a.

In the above embodiment, the optical-fibercable 1 has a clad external diameter of 750 μm and gives a transmission loss of 230 dB/km. A difference of refractive index between the core portion 11 and the clad portion 12 is equal to approximately 0.002.

Figure 4:
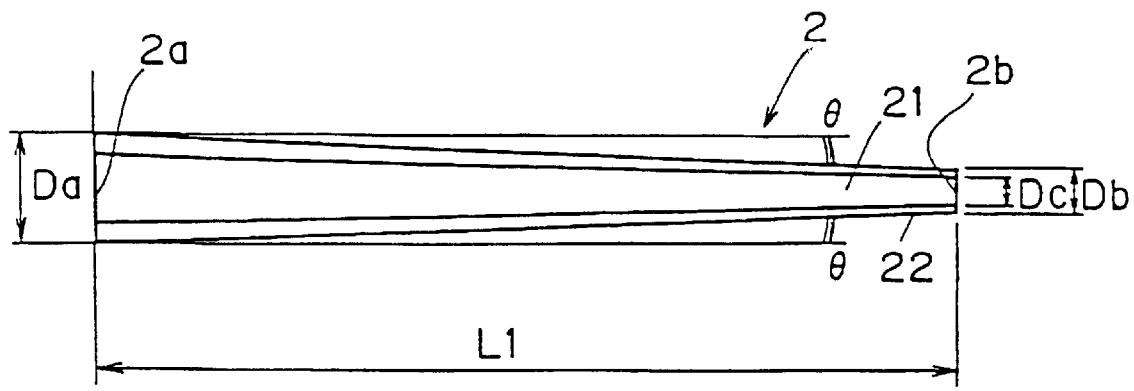
FIG. 4 schematically illustrates the shape of the cable-adapting device.

As shown in FIG. 4, the cable-adapter (cable adapter device) 2 has a frusto-conical shape comprises a core 21 and a clad portion 22. A tapered surface of the cable adapter 2 is further covered by a low refractive index film or coating 23 (see FIG. 3).

In the illustrated embodiment, cable-adapter 2 extends the length of the plastic optical fiber of the fiber optic cable 1, and has a numerical aperture that is the same as the optical fiber. For instance, cable-adapter 2 may have a length L1 of 6 mm. The frusto-conical shape, consisting of a core 21 and a clad portion 22, has a large face 2a having a large diameter Da measuring approximately 750 μm, corresponding to the outer diameter of the optical fiber cable 1. The cable-adapter 2 also has a small face 2b having a diameter Dc that ranges from approximately 200 μm to 700 μm in diameter. The core 21 and the clad portion 22 of the cable-adapter 2 has the same layer-thickness ratio as the core 11 and the clad portion 12 of the optical fiber cable 1. The same thickness ratio must be kept at the small face 2b of the cable-adapter 2, i.e., $$Dc = \alpha Db$$

wherein Dc signifies the diameter of the core 21 at the small face 2b, Db signifies the diameter of the clad 22 at the small face 2b, and α signifies the layer thickness ratio (i.e., core diameter/clad portion diameter).

Figure 5:
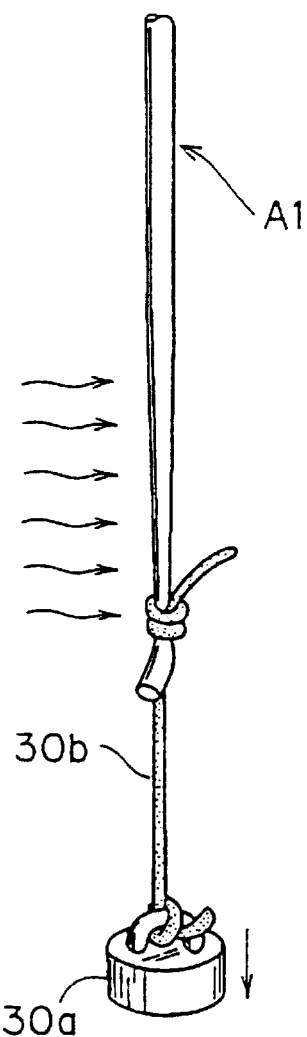
FIG. 5 illustrates a perspective view of a procedure when the cable-adapting device is manufactured.

The above-mentioned frusto-conical shape (21, 22) is formed by, for example, stacking the core 21 and the clad portion 22 on the optical fiber cable 1 and applying a force of approximately 100 g at the end portion thereof, in an axial direction while heating, thereby elongating the frusto-conical shape. FIG. 5 illustrates this method. A weight 30a of approximately 100 g is tied to the end portion of a plastic optical fiber A1 through a thread 30b. A portion adjacent to the end portion is heated to approximately 150° C. by a stream of hot air passing along a span of approximately 10 mm of the plastic optical fiber. By varying the heating time from 5 to 10 seconds, the optical fiber A1 is expanded by virtue of the weight 30a, to obtain a cable-adapter 2 having a frusto-conical shape, as shown in FIG. 4.

Figure 6:
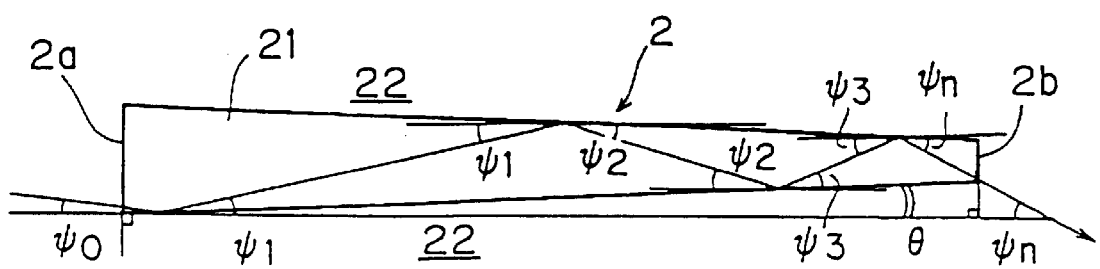
FIG. 6 shows the principle of the light advancement inside the cable-adapting means.

When an optical wave path is formed in the frusto-conical shape, the advancing light is reflected at the interface of the core 21 and the clad portion 22, as shown in FIG. 6. At every reflection, angles $\psi_1, \psi_2, \psi_3, \ldots, \psi_n$ of the advancing light, with respect to the optical axis, become greater. When θ is defined as an inclination of the tapered surface relative to the optical axis and $\psi_0$ is defined as an angle of incidence of the light towards the core 21, the successive angles $\psi_1, \psi_2, \psi_3, \ldots, \psi_n$ of the advancing light vis-a-vis the optical axis can be formulated as follows:

$$\psi_1 = \psi_0 + 2\theta$$
$$\psi_2 = \psi_1 + 2\theta$$
$$\psi_3 = \psi_2 + 2\theta$$
$$\vdots$$
$$\psi_{(n-1)} = \psi_{(n-2)} + 2\theta$$
$$\psi_n = \psi_{(n-1)} + 2\theta$$

Subsequently, the angle $\psi_n$ after n-times reflections at the interface of the core 21 and the clad 22 can be defined as follows:

$$\psi_n = \psi_0 + 2\theta \times n$$

This equation indicates that the reflection angle of the light at the interface of the core 21 and the clad portion 22 increases with the number of reflections.

Accordingly, by repeating the reflections, the advancing light inside the fiber tends to go through the interface, which leads to increased light leakage. To prevent the leakage of light, the tapered surface of the cable-adapter 2 is painted with a low refractive index film 23, made of, for example, PMMA (polymethyl-methacrylate)or other similar material, which has a refractive index lower than that of the clad portion 22. By virtue of this structure, the light passing through the interface of the core 21 and the clad portion 22 is fed back into the core 21. In this construction, the small-diameter face 2b of the cable-adapter 2 has a numerical aperture (NA) of 0.5.

The cable-adapter 2 is affixed (adhered) to the light-exit end-face 1a of the optical-fiber cable 1 through a transparent soft silicone elastomer 24 (see FIGS. 2 and 3). This elastomer 24 is produced by extending a base material of a high refractive index silicone, forming a sheet that is hardened at room temperature, and carefully punching out the elastomer 24 from the sheet. Such a silicone elastomer 24 is designed to have a refractive index of approximately 1.495, the figure being the same as that of the cores 11, 21 of the optical-fiber cable 1 and the cable-adapter 2, respectively. In this manner, a Fresnel reflection at the interface between the core 11, 21 and the soft silicone elastomer 24 is prevented.

Alternatively, a matching oil could be used instead of the silicone elastomer 24 to attach (affix) the fiber optic cable 1 to the cable-adapter 2. However, the viscosity of the oil tends to vary with temperature and generates air bubbles when pouring. This may affect the stability of the communication path. Accordingly, the use of a silicone-based, high refraction material is preferably employed.

Figure 7:
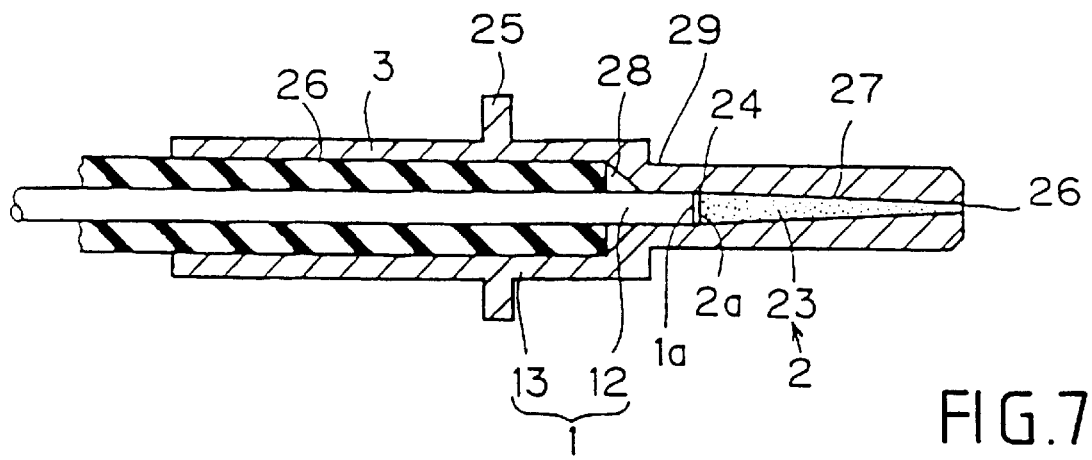
FIG. 7 shows a cross-sectional view of the light exiting portion of the optical-transmission device according to the first embodiment.

The ferrule 3 may be manufactured, for example, by cutting a brass material in the shape illustrated in FIG. 7. The ferrule 3 is provided with a flange 25 that projects outward in a radial direction, half-way along an axial direction. The flange 25 abuts a connector (not shown in the drawings). The ferrule 3 further includes a cable path-hole 29 comprising a fiber housing 26 having a void diameter corresponding to the diameter of the coating 13 of the cable 1, a cable-adapter housing 27 that holds the cable-adapter 2 and has an exposed end portion and a slant housing 28 connecting these two housings. The three housings are sequentially formed in the same axial direction. Moreover, the cable-adapter housing 27 has a void frusto-conical shape corresponding to the shape of the cable-adapter 2.

The functions of the above-mentioned device will be explained below. As shown in FIG. 2, the light-exit end-face 1a of the fiber optic cable 1 is adhered (stuck) to the cable-adapter 2 via the soft silicone elastomer sheet 24. The resulting assembly is inserted through the cable path hole 29 of the ferrule 3. The photodiode (PD) 31 (shown in FIG. 2) is then placed proximate (e.g., face-to-face near) the end portion of the cable-adapter 2.

In the disclosed embodiment, the photodiode 31 comprises a small surface chip that is used for high speed communication. A light source 32, such as, for example, a light emitting diode (LED) is positioned proximate (e.g., face-to-face near) the light-receiving face 1b of the fiber optic cable 1.

The light emitting diode 32 is turned ON and OFF to emit a predetermined optical signal on the light-receiving face 1b. The light moves through the cable 1 by repeated reflections at the interface of the core 11 and the clad portion 12, and exits through the light-exit end-face 1a. The light passes through the soft silicone elastomer 24, which has the same refractive index as that of the cable, and goes through the large-diameter face 2a of the cable-adapter 2 into the core 21. Since the soft silicone elastomer 24 has the same level of refractive index as that of both cores 11 and 21, the optical loss due to Fresnel reflection is efficiently minimized.

The light penetrating into the core 21 of the cable-adapter 2 moves through the cable-adapter 2 by successive reflections at the interface of the core 21 and the clad portion 22. During this procedure, as discussed above, the angle of reflection of the light at the interface of the core 21 and the clad portion 22 increases according to the number of reflections However, as the clad portion is further coated (painted) with a low refractive index film, light leakage is efficiently prevented.

The light passes through the small diameter face 2a and impinges (hits) a receiving surface of the photodiode 31, which transforms the light into an electrical signal. The electrical signal is treated by a processing circuit 33 (see FIG. 2). As discussed above, the photodiode 31 comprises a small surface chip that operates at a high speed. When the small diameter face 2b of the cable-adapter 2 is designed to have a dimension corresponding to the chip surface of the photodiode 31, most of the light leaving the small diameter face 2b can be recovered by the light-receiving face of the photodiode 31, such that an optical loss incurred at this stage can be greatly reduced.

Table 1 shows variations of the light-reception sensitivity of a photodiode, when the external diameter of the small face 2b of the cable-adapter 2 is varied. However, the photodiode used for these experiments has a large surface chip. Consequently, in the case of the maximal external diameter of 750 μm, the exit-light from the cable-adapter 2 is considered to be fully (entirely) recovered by the photodiode. In these experiments, the fiber optic cable 1 has a length of approximately 2 m. The light-emitting diode 32 used in these experiments has a median wavelength of 700 nm and an output power of approximately 3 dBm. The cable-adapter 2 have a length L1 of approximately 6 mm. The frusto-conical shape (consisting of core 21 and clad 22) comprises the large face 2a having a diameter Da of 750 μm, which corresponds to the external diameter of the fiber optic cable 1. Clad portion 12 has an external diameter of 750 μm. As such, when the small-diameterface 2b has an outer diameter of 750 μm, tapering is totally removed.

TABLE 1

| Small face of the cable-adapter (external diameter) | Light reception sensitivity |
| --- | --- |
| 250 μm | −15.519 dBm |
| 300 μm | −14.974 dBm |
| 350 μm | −14.477 dBm |
| 400 μm | −14.821 dBm |
| 450 μm | −14.309 dBm |
| 500 μm | −13.719 dBm |
| 550 μm | −13.104 dBm |
| 600 μm | −12.413 dBm |
| 650 μm | −12.252 dBm |
| 700 μm | −11.722 dBm |
| 750 μm (no tapered surface) | −11.116 dBm |

In the above-mentioned experiments, the photodiode used has a large surface chip. In practice, when a photodiode 31 for high speed processing (small surface chip) has a receiving-surface diameter of, for instance, 250 μm, a final light-reception sensitivity must be calculated taking into account this difference in surface size. When light signals uniformly leave the end surface of the plastic fiber optic (having an external diameter of 750 μm) and are captured by a photodiode having a diameter of 250 μm, only 11% of the original signals are received on the basis of the surface ratio. This can be transformed into dBm as follows:

$$-10 \times \text{Log}(0.11) = 9.54 (\text{dB});$$

indicating that the optical signal level (volume) is decreased (lowered) by 9.54 dBm.

On the other hand, Table 1 shows that when the small diameter face of 750 μm is compared with 250 μm, the light-reception sensitivity is lowered by only approximately 4.4 dBm (−11.116 dBm minus −15.519 dBm).

By adding the cable-adapter 2 to the fiber optic cable 1, the light-reception sensitivity is lowered by about 4.4 dBm (−15.519). In comparison, the past (prior art) devices exhibit a sensitivity loss (decrease) of 9.54 dBm, calculated on the basis of the surface ratio, with respect to the original light intensity (−11.116). Thus, compared with the prior art example, a gain of $$9.54 - 4.4 = 5.14 \text{dBm}$$

is obtained.

Consequently, even if the incidence plane of an optical receptor, such as photodiode 31, becomes very small, optical signals inside the cable-adapter 2 become intensified as they approach the small diameter face 2b.

Reduced (decreased) optical losses enable an efficient light connection. To efficiently bind a photodiode 31, designed for receiving a high speed light signal (e.g., over the order of several hundred Mbps in particular), a step-index type fiber optic cable 1, developed for high-speed light communications, may be used as the transmission medium. By adding a frusto-conical cable-adapter 2 to its edge, the two parts are efficiently bound and the subsequent optical loss is minimized.

Further, when adhering (affixing) the cable-adapter 2 to the light-exit end-face 1a of the fiber optic cable 1, the soft silicone elastomer 24 can be used for binding them. Handling thus becomes easy.

Figure 8:
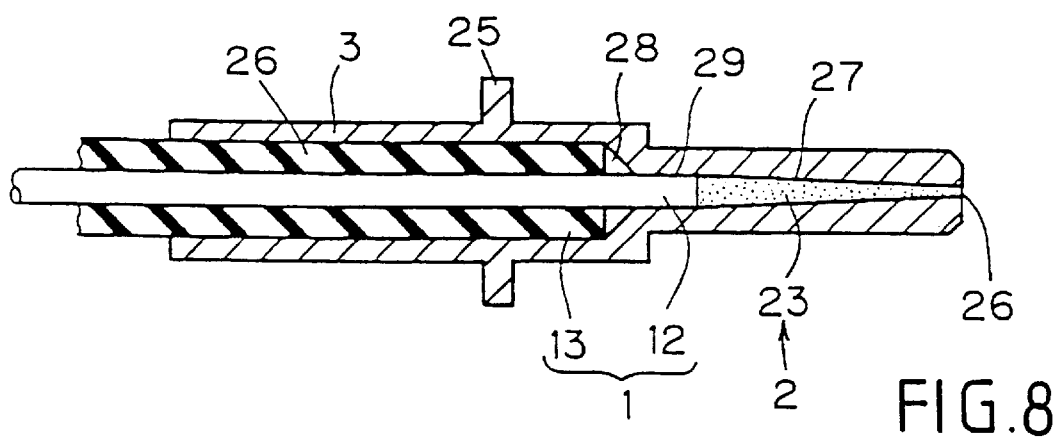
FIG. 8 illustrates a cross-sectional view of the light exiting portion of a device according to a second embodiment of the present invention.
Figure 9:
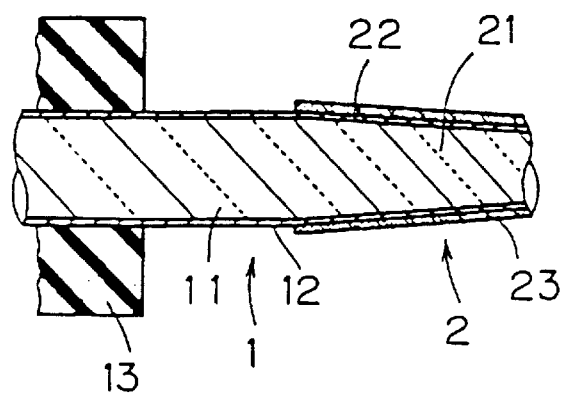
FIG. 9 illustrates a cross-sectional view of the fiber optic cable and the cable-adapting device according to the second embodiment, when they are integrally formed.

FIGS. 8 and 9 illustrate the optical transmission device according to a second embodiment. Elements in the second embodiment that are correspondently functional to elements in the first embodiment are given the same reference numbers.

In the first embodiment of the present invention, cable-adapter 2 is affixed to the light-exit end-face 1a of a known graded-index type optical fiber (fiber optic) cable 1 via the soft silicone elastomer 24. In the device according to the second embodiment, one end of a known plastic optical fiber is drawn directly from the plastic optical fiber cable 1 and the cable-adapter 2. This type of device may be manufactured by drawing the cable by virtue of a weight, as shown in FIG. 5.

In the second embodiment, the optical fiber cable 1 and the cable-adapter 2 comprise a core 11 and 21, respectively, and a clad portion 12, 22. The external cylindrical surface of the clad 12 of the cable 1 is covered with a coating 13. Likewise, the external cylindrical surface of the clad portion 22 of the cable-adapter 2 is painted with a low refractive index film 23. This configuration is similar to the first embodiment. However, in the second embodiment, the cable-adapter 2 is formed by drawing an end of the plastic optical fiber. The soft silicone elastomer 24 is therefore not used in this embodiment. The other constructions are the same as those of the first embodiment.

Table 2 illustrates the light-reception sensitivity of varying diameters of the cable-adapter 2, obtained with the device according to the second embodiment. The experimental conditions are the same as in the first embodiment represented in Table 1.

TABLE 2

| Small face of the cable-adapter (external diameter) | Light reception sensitivity |
| --- | --- |
| 250 µm | −15.305 dBm |
| 300 µm | −14.217 dBm |
| 350 µm | −14.399 dBm |
| 400 µm | −13.298 dBm |
| 450 µm | −13.157 dBm |
| 500 µm | −12.450 dBm |
| 550 µm | −12.288 dBm |
| 600 µm | −12.284 dBm |
| 650 µm | −11.783 dBm |
| 700 µm | −11.170 dBm |
| 750 µm (without tapered surface) | −11.116 dBm |

As mentioned in Table 2, when the light leaving the small diameter face 2b of the cable-adapter 2 is received by a photodiode having, for instance, a diameter of 250 µm, the light reception sensitivity measures −15.305 dBm. Compared with the device without the taper of the second embodiment, there is a reduction (decrease) of only approximately 4.189 dBm. The loss is greatly reduced with respect to the value of 9.54 dBm obtained for the prior art example. Accordingly, as in the first embodiment, the light-reception sensitivity is improved vis-α-vis the results in the prior art, when using a photodiode 31 with a small surface chip for high speed transmission.

In the first embodiment, the cable-adapter 2 is bound to the light-exit end face 1a of a known optical-fibercable 1 through the soft silicone elastomer 24. According to the second embodiment, the optical-fiber cable 1 and the cable-adapter 2 are integrally formed by a drawing operation.

In a third embodiment of the present invention, the same cable-adapter (cable-adapting device) 2 as in the first embodiment is placed at the light-exit end-face 1a of a known step-index type plastic optical fiber 1. The cable-adapters are housed into the ferrule 3 and properly positioned. However, the soft silicone elastomer 24 is not used in the third embodiment. Except for that point, all the other structural features are the same as those of the first embodiment.

The light reception sensitivities, measured for the above device is represented in Table 3. The experimental conditions were the same as for the first embodiment.

TABLE 3

| Small face of the cable-adapter (external diameter) | Light reception sensitivity |
| --- | --- |
| 250 µm | −16.003 dBm |
| 300 µm | −15.571 dBm |
| 350 µm | −15.379 dBm |
| 400 µm | −15.460 dBm |
| 450 µm | −15.100 dBm |
| 500 µm | −14.219 dBm |
| 550 µm | −14.004 dBm |
| 600 µm | −13.213 dBm |
| 650 µm | −13.112 dBm |
| 700 µm | −12.522 dBm |
| 750 µm (without tapered surface) | −11.116 dBm |

As shown in Table 3, when the light leaving the small diameter face 2b of the cable-adapter 2 is captured by a photodiode having, for instance, a 250 µm diameter, the light-reception sensitivity amounts to −16.003 dBm. This means that the sensitivity is reduced (lowered) by only 4.887 dBm compared to that obtained when using a device without the taper. Compared to the 9.54 dBm reduction (decrease) in the prior art, the loss is greatly reduced. Compared to the first embodiment, the optical loss due to bonding is increased by a degree corresponding to the absence of the soft silicone elastomer 24. However, when a photodiode 31 is used with a small surface chip for high speed transmission, this sensitivity is greatly improved, as compared to the prior art.

In embodiments 1 to 3, the fiber optic cable 1 belongs to a step-index type cable. Therefore, the cable-adapter 2 comprises a core 21 having a uniform refractive index. Alternatively, in the device according to a fourth embodiment, a graded-index type (distributed refractive index type) fiber optical is used, in which the refractive index varies inside the core of plastic optical-fiber cable 1.

Figure 10:
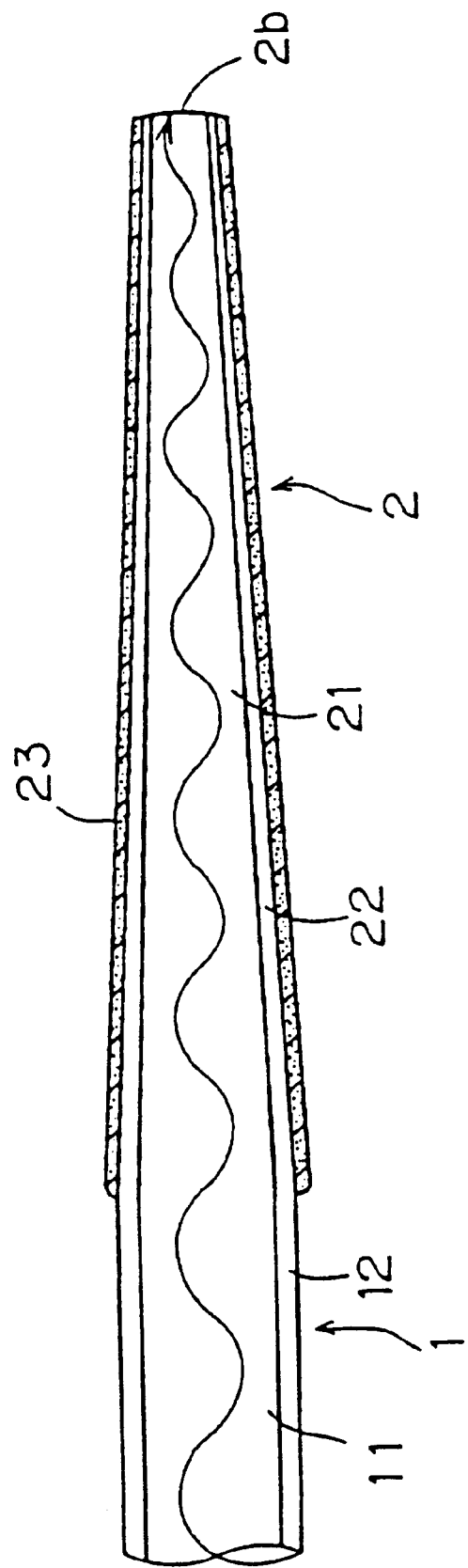
FIG. 10 is a cross-sectional view of the fiber optic cable and the cable-adapting device according to a fourth embodiment of the present invention.

FIG. 10 illustrates an optical transmission device according to the fourth embodiment. The same reference numbers are used for the same functional elements described in the previous embodiments. In the present embodiment, a graded-index type plastic optical-fiber cable is used as the fiber optic cable 1 and the cable-adapter 2. The cable-adapter 2 is prepared in the same manner discussed with respect to the second embodiment, shown in FIG. 5, by directly drawing the end portion of a known graded-index type optical-fiber. Therefore, the fiber optic cable 1 and the cable-adapter 2 are integrally formed. Further, as in the second embodiment, a low refractive index film 23 is formed (painted) on the clad 22 of the cable-adapter 2. The graded-index type plastic optical fiber has a core, a diameter of which accounts for about 70% of the diameter of the optical fiber. The remaining 30% of the diameter of the optical fiber comprises a surrounding clad.

The same ratios (discussed above with respect to the first embodiment) of the core and clad 11 and 21, respectively, of the optical fiber cable 1, to the core and clad 12 and 22, respectively, of the cable-adapter 2 are maintained in the fourth embodiment.

In the graded-index type optical fiber cable 1, a diameter of the clad 12, a difference in specific refractive index, and a predetermined distribution coefficient of the refractive index are designated as 2a, Δ, and α (≅2), respectively. A refractive index n(r), at a point located at a distance r from a central axis, can be calculated by the following formula:

$$n(r) = n_1(1 - 2\Delta(r/a)^\alpha)^{1/2} \quad (0 \le r \le a \text{ (core)})$$

$$n(r) = n_2 = n_1(1 - 2\Delta)^{1/2}$$

$$\cong n_1(1 - \Delta) \quad (a < r\text{(clad)})$$

According to the above equations, both in the graded-index type fiber optic cable 1 and the cable-adapter 2, the refractive index continuously decreases as the cores 11 and 21 approach the respective clads 12 and 22. According to the refractive index distribution shown in FIG. 10, only an axial beam, located in the center of the cores 11 and 21, advances linearly. The beams outside this central axis continuously change their direction and return to the central axis.

Such a locus of the beams is observed not only in the fiber optic cable 1, but also in the cable-adapter 2. In the cable-adapter 2, the amplitude of the light wave becomes smaller, in proportion to a decrease in the diameter size. Light beams inside the fiber optic cable 1 converge as they approach the small diameter face 2b of the cable-adapter 2. Accordingly, as shown in FIG. 2, the optical signal loss is greatly reduced when the beams are targeted from the small face 2b of the cable-adapting means 2 to a photodiode 31 having a small surface chip.

Light reception sensitivity measured for the device of the fourth embodiment is represented in Table 4. The experimental conditions are the same as described for the second embodiment, except for the use of a graded-index type fiber optic cable 1 and cable-adapter 2.

TABLE 4

| Small face of the cable-adapter (external diameter) | Light reception sensitivity |
|---|---|
| 150 μm | −16.283 dBm |
| 200 μm | −13.964 dBm |
| 250 μm | ****** |
| 300 μm | −13.442 dBm |
| 350 μm | −13.277 dBm |
| 400 μm | −12.596 dBm |
| 450 μm | −12.723 dBm |
| 500 μm | −12.373 dBm |
| 550 μm | −12.299 dBm |
| 600 μm | −12.431 dBm |
| 650 μm | −12.173 dBm |
| 700 μm | −12.071 dBm |
| 750 μm (without tapered surface) | −12.086 dBm |

As shown in Table 4, an optical signal that uniformly leaves a fiber optic cable having a 500 μm diameter core may be received by a photodiode 31 having a 200 μm diameter chip. Calculated with respect to the surface ratio, only 16% of the original signals can be received. When converted into dBm, the signal level reduction (decrease) is:

−10×Log(0.16)=7.96dBm.

In the graded-index type plastic optical fiber, the core accounts for about 70% of the fiber diameter. Accordingly, to obtain a core diameter of 200 μm in the small-diameter face 2b of the cable-adapting means 2, the external diameter of the face 2b must measure approximately 300 μm. In Table 4, when the external diameter of the small face 2b, 750 μm, is compared with that of 300 μm, the sensitivity in the latter is lower than in the former by 1.4 dBm. If the surface ratio is calculated, the light intensity must be lower than the original intensity by 7.96 dBm. As the decrease is confined to a mere 1.4 dBm, a gain of 6.56 dBm (7.96−1.4) is attained.

Figure 11:
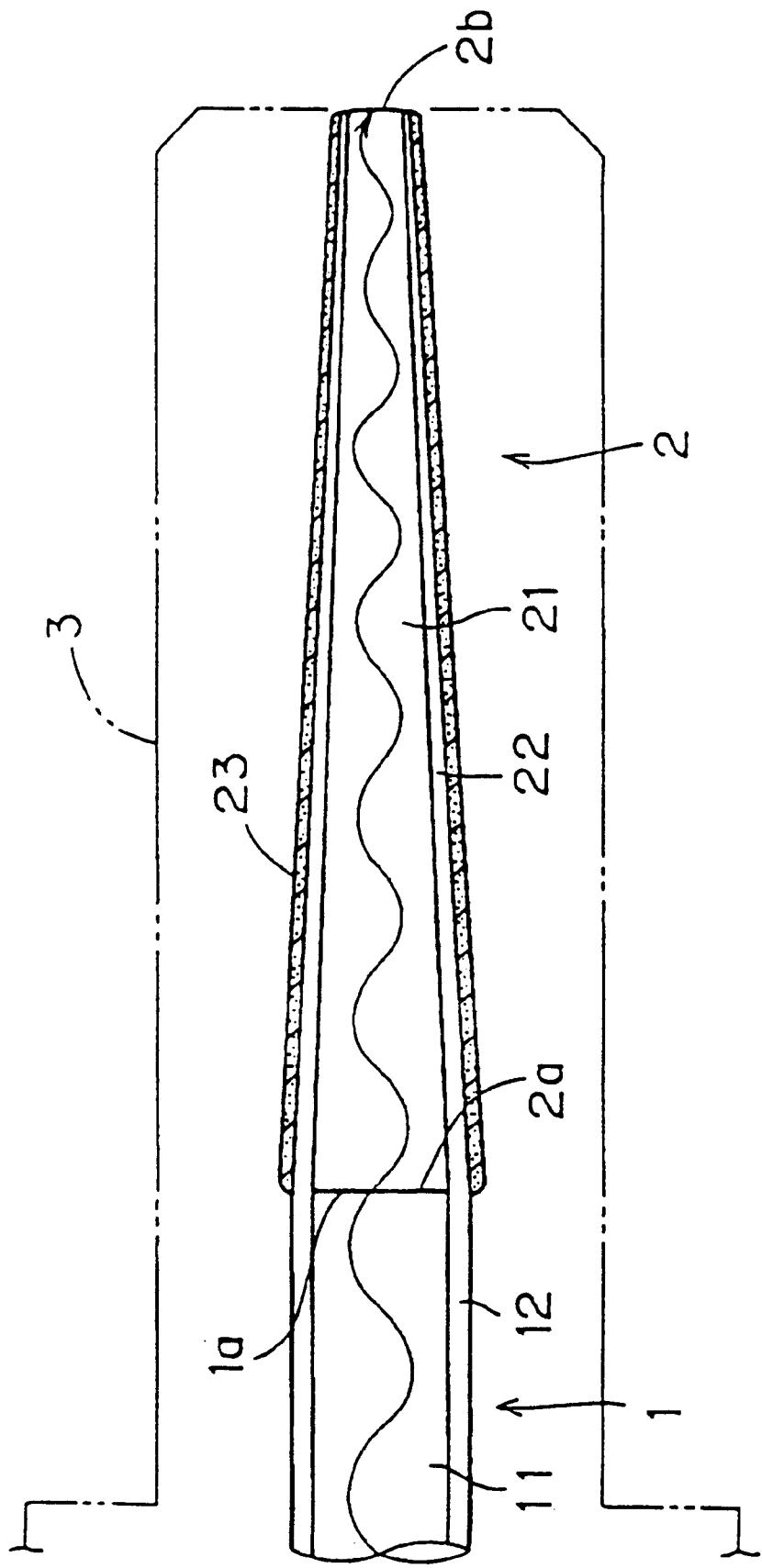
FIG. 11 is a cross-sectional view of the fiber optic cable and the cable-adapting means of a device according to a fifth embodiment.

FIG. 11 illustrates a device according to a fifth embodiment of the present invention. The reference numbers are the same as previously used. According to this embodiment, the graded-index type core is used for the plastic optical fiber cable 1 and the cable-adapter 2, as in the fourth embodiment. However, the fiber optic cable 1 and the cable-adapter 2 are prepared as separate pieces, and arranged in a proper position inside the ferrule 3. In addition, the cable-adapter 2 is prepared in a manner similar to the fourth embodiment, and cut out in a predetermined dimension. The cable-adapter 2 is made of the same material as that of the optical fiber cable 1, or of a similar type material having the same level of numerical apertures as that of the optical fiber cable 1.

The light-reception sensitivities measured with the device of the fifth embodiment, are represented in Table 5. The experimental conditions are as previously described.

TABLE 5

| Small face of the cable-adapter (external diameter) | Light reception sensitivity |
|---|---|
| 150 μm | −18.211 dBm |
| 200 μm | −15.239 μm |
| 250 μm | ****** |
| 300 μm | −14.387 μm |
| 350 μm | −14.502 μm |
| 400 μm | −14.669 μm |
| 450 μm | −13.510 μm |
| 500 μm | −13.732 μm |
| 550 μm | −13.526 μm |
| 600 μm | −13.637 μm |
| 650 μm | −12.991 μm |
| 700 μm | −13.007 μm |
| 750 μm (without tapered surface) | −12.086 μm |

As described in the fourth embodiment, the optical loss exhibited in the prior art can be theoretically estimated to be approximately 7.96 dBm. However, when the small face 2b, having an external diameter of 300 μm (−14.387 dBm), is compared with the diameter of 750 μm (−12.086 dBm), the former has an intensity lower than the latter by 2.301 dBm (14.387−12.086). When calculated by the surface ratio, the decrease must be 7.96 dBm with regards to the original intensity. Compared to that, the actual decrease is confined to 2.30 dBm. This embodiment incurs an optical loss due to the bonding during the course of the transmission, which is different from the fourth embodiment. However, it attains a gain of 5.66 dBm (7.96−2.30), as compared to the prior art.

Each of the disclosed embodiments employs a plastic fiber optical cable having a relatively large core diameter. As such, an object of these embodiments is to converge the beams leaving the plastic optical fiber. This method can also be applied in the same manner to a glass optical fiber having a relatively large core.

Although the present invention has been described with reference to particular means, materials and embodiments, it is to be understood that the invention is not limited to the particulars disclosed and extends to all equivalents within the scope of the claims.

What is claimed:

1. An optical-transmission device having an optical axis, comprising:
   a fiber optic cable having a light-exit face with a predetermined diameter, a cable core, and a cable cladding;
   a cable-adapter that connects said fiber optic cable to a light-receiving element, said cable-adapter having a frusto-conical shape with a tapered cylindrical surface, a large face and a small end face, said large face having a diameter substantially equal to said predetermined diameter of said light-exit face of said fiber optic cable, the diameter of said tapered cylindrical surface gradually decreasing from said large face towards said small end face along said optical axis, said cable adapter further comprising an adapter core and an adapter cladding, an adapter core/adapter cladding ratio at the small end face being the same as a cable core/cable cladding ratio; and a ferrule that covers at least said light-exit face of said fiber optic cable and said large face of said cable-adapter.

2. The optical-transmission device of claim 1, wherein said ferrule comprises an inside surface corresponding to said tapered cylindrical surface of said cable-adapter, thereby securely holding said cable-adapter.

3. The optical-transmission device of claim 1, wherein said cable-adapter comprises an optical fiber material having a same level of numerical aperture as that of said fiber optic cable.

4. The optical-transmission device of claim 2, wherein said cable-adapter comprises an optical fiber material having a same level of numerical aperture as that of said fiber optic cable.

5. The optical-transmission device of claim 1, wherein said fiber optic cable and said cable-adapter are respectively comprise a core portion having a same level of refractive index as the other, and are bonded to each other via a transparent binding material having a same level of refractive index as that of said core portions.

6. The optical-transmission device of claim 2, wherein said fiber optic cable and said cable-adapter are respectively comprise a core portion having a same level of refractive index as the other, and are bonded to each other via a transparent binding material having a same level of refractive index as that of said core portions.

7. The optical-transmission device of claim 3, wherein said fiber optic cable and said cable-adapter are respectively comprise a core portion having a same level of refractive index as the other, and are bonded to each other via a transparent binding material having a same level of refractive index as that of said core portions.

8. The optical-transmission device of claim 4, wherein said fiber optic cable and said cable-adapter are respectively comprise a core portion having a same level of refractive index as the other, and are bonded to each other via a transparent binding material having a same level of refractive index as that of said core portions.

9. The optical-transmission device of claim 1, wherein said fiber optic cable and said cable-adapter are integrally formed.

10. The optical-transmission device of claim 2, wherein said fiber optic cable and said cable-adapter are integrally formed.

11. The optical-transmission device of claim 3, wherein said fiber optic cable and said cable-adapter are integrally formed.

12. The optical-transmission device of claim 4, wherein said fiber optic cable and said cable-adapter are integrally formed.

13. The optical-transmission device of claim 1, wherein said cable-adapter comprise a core portion and a clad portion, said clad portion having a same level of refractive index as that of said core portion.

14. The optical-transmission device of claim 5, wherein said cable-adapter further comprises a clad portion, said clad portion having said same level of refractive index as that of said core portion.

15. The optical-transmission device of claim 9, wherein said cable-adapter further comprises a clad portion, said clad portion having said same level of refractive index as that of said core portion.

16. The optical-transmission device of claim 13, wherein said clad portion is covered with a coating having a refractive index lower than that of said clad portion.

17. The optical-transmission device of claim 14, wherein said clad portion is covered with a coating having a refractive index lower than that of said clad portion.

18. The optical-transmission device of claim 15, wherein said clad portion is covered with a coating having a refractive index lower than that of said clad portion.

19. The optical-transmission device of claim 1, wherein said fiber optic cable comprises a plastic fiber optic cable.

20. The optical-transmission device according to claim 1, wherein said fiber optic cable comprises a step-index type fiber optic cable.

21. The optical-transmission device of claim 1, wherein said fiber optic cable comprises a graded-index type fiber optic cable.

22. An optical-transmission device having an optical axis, comprising:

a fiber optic cable having a light-exit face with a predetermined diameter, a cable core, and a cable cladding;

cable-adapting means for adapting said fiber optic cable to a light-receiving element, said cable-adapting means having a predetermined shape with a tapered cylindrical surface, a large face and a small end face, said large face having a diameter substantially equal to said predetermined diameter of said light-exit face of said fiber optic cable, the diameter of said tapered cylindrical surface gradually decreasing from said large face towards said small end face along said optical axis, said cable adapting means further comprising an adapter core and an adapter cladding, an adapter core/adapter cladding ratio at the small end face being the same as a cable core/cable cladding ratio; and a ferrule that covers at least said light-exit face of said fiber optic cable and said large face of said cable-adapting means.

* * * * *